United States Patent
Kitagawa et al.

(10) Patent No.: US 11,326,893 B2
(45) Date of Patent: May 10, 2022

(54) DISPLAY DEVICE FOR VEHICLE

(71) Applicant: MAZDA MOTOR CORPORATION, Hiroshima (JP)

(72) Inventors: Hiroyuki Kitagawa, Hiroshima (JP); Tadashi Yagumo, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 56 days.

(21) Appl. No.: 16/758,060

(22) PCT Filed: Oct. 29, 2018

(86) PCT No.: PCT/JP2018/040020
§ 371 (c)(1),
(2) Date: Apr. 22, 2020

(87) PCT Pub. No.: WO2019/087995
PCT Pub. Date: May 9, 2019

(65) Prior Publication Data
US 2021/0190524 A1  Jun. 24, 2021

(30) Foreign Application Priority Data
Nov. 1, 2017  (JP) .............................. JP2017-211467

(51) Int. Cl.
*G01C 21/34* (2006.01)
*B60L 50/60* (2019.01)
*G01C 21/36* (2006.01)

(52) U.S. Cl.
CPC ..... *G01C 21/3476* (2013.01); *G01C 21/3469* (2013.01); *G01C 21/3682* (2013.01); *B60L 50/60* (2019.02); *B60L 2250/16* (2013.01)

(58) Field of Classification Search
CPC ............ G01C 21/3476; G01C 21/3469; G01C 21/3682; G08G 1/0968; G09B 29/00; B60L 50/60; B60L 2250/16
See application file for complete search history.

(56) References Cited

U.S. PATENT DOCUMENTS

2010/0138098 A1* 6/2010 Takahara ........... G01C 21/3469
701/31.4
2011/0112710 A1 5/2011 Meyer-Ebeling et al.
(Continued)

FOREIGN PATENT DOCUMENTS

EP  2 631 595 A1  8/2013
EP  2 690 408 A1  1/2014
(Continued)

OTHER PUBLICATIONS

Morita Takashi, JP2017111777—Travel Support System, 2017 (Year: 2017).*
(Continued)

*Primary Examiner* — Rachid Bendidi
*Assistant Examiner* — Carlos Laguerre
(74) *Attorney, Agent, or Firm* — Studebaker & Brackett PC

(57) ABSTRACT

A vehicle display device calculates a travel distance limit of an own vehicle, based on an energy remaining amount of the own vehicle; calculates a degree of scattering being a numerical value indicating a degree of remoteness between a farthest supply facility farthest from the own vehicle, and other supply facilities present within a predetermined distance from the farthest supply facility; calculates a travelable distance being a distance by which the own vehicle is able to travel, based on the travel distance limit and the degree of scattering; and causes the display to display the calculated travelable distance. In the processing of calculating the
(Continued)

travelable distance, the travelable distance is decreased, as the degree of scattering increases.

7 Claims, 5 Drawing Sheets

(56) References Cited

U.S. PATENT DOCUMENTS

| | | | |
|---|---|---|---|
| 2013/0218458 A1 | 8/2013 | Scholl | |
| 2013/0345976 A1* | 12/2013 | Li | G01C 21/3476 701/533 |
| 2014/0052374 A1 | 2/2014 | Hoch et al. | |
| 2017/0074671 A1* | 3/2017 | Yoshimura | B60L 53/60 |
| 2019/0025068 A1* | 1/2019 | Yoshino | G01C 21/3407 |

FOREIGN PATENT DOCUMENTS

| | | | | |
|---|---|---|---|---|
| JP | 2000-046571 A | | 2/2000 | |
| JP | 2010-122117 A | | 6/2010 | |
| JP | 2013-142679 A | | 7/2013 | |
| JP | 2015-069259 A | | 4/2015 | |
| JP | 2016-217769 A | | 12/2016 | |
| JP | 2017032654 A | * | 2/2017 | |
| JP | 2017111777 A | * | 6/2017 | |
| WO | WO-2011101885 A1 | * | 8/2011 | ......... G01C 21/3697 |
| WO | WO-2013105640 A1 | * | 7/2013 | ......... G01C 21/3682 |
| WO | WO-2013172157 A1 | * | 11/2013 | ......... G01C 21/3469 |
| WO | WO-2014073028 A1 | * | 5/2014 | ............. B60L 58/12 |

OTHER PUBLICATIONS

International Search Report issued in PCT/JP2018/040020; dated Jan. 15, 2019.

The extended European search report issued by the European Patent Office dated Oct. 23, 2020, which corresponds to European Patent Application No. 18874809.9-1001 and is related to U.S. Appl. No. 16/758,060.

* cited by examiner

DISPLAY DEVICE FOR VEHICLE

TECHNICAL FIELD

The present invention relates to a display device for displaying a travelable distance, based on an energy remaining amount and the like of a vehicle, and notifying a driver.

BACKGROUND ART

In recent years, an electric vehicle (EV) which travels by driving a motor by electric power accumulated in a battery, and does not discharge exhaust gas containing harmful substances during traveling has been paid attention to. As the battery mounted in the EV, a repeatedly chargeable and dischargeable secondary battery such as a lithium-ion battery is employed. A remaining amount of charged electric power (hereinafter, referred to as a battery remaining amount) is constantly calculated and monitored from a charging state of the secondary battery. A display unit provided in the EV displays a calculated battery remaining amount, a travelable distance calculated based on the battery remaining amount, an average electricity efficiency of the EV, etc., and the like. Further, for example, when the battery remaining amount becomes equal to or lower than a predetermined reference value, the display unit displays in such a way that the driver is encouraged to charge the battery.

It is necessary to move the EV to a chargeable place by using another vehicle, when the EV encounters a state called lack of electricity in which the battery remaining amount becomes zero, and is unable to travel. As compared with a case that a vehicle which travels by using an engine (an internal combustion engine) as a driving source encounters a state called out-of-gas, it is difficult to return the EV to a travelable state. Further, an upper limit distance (a cruising distance) travelable from a folly filled state or a fully charged state tends to be shortened in the EV, as compared with a vehicle which travels by an engine. Further, the travelable distance also changes depending on a traveling environment such as a slope of a road and a traffic congestion, and an operation condition of an accessory such as an air-conditioner, for example.

For these reasons, a driver of the EV tends to be keenly aware of the travelable distance. When the travelable distance is shortened by a decrease in battery remaining amount, the driver may be forced to travel, while suppressing battery consumption by voluntarily suppressing an operation of an accessory, for example.

In order to prevent lack of electricity of the EV, for example, as disclosed in Patent Literature 1, there is known a technique of specifying an area where the battery remaining amount is likely to lower, based on information about charging states of a plurality of EVs, and notifying the driver of the area as an area where lack of electricity is likely to occur. Further, there is a case that the EV encounters lack of electricity before the EV arrives at a charging facility depending on a traffic congestion and the like of a road. As a technique for avoiding this situation, as disclosed in Patent Literature 2, there is known a technique of displaying a charging facility near a current location with respect to a place where congestion has occurred on a traveling route to a destination.

When a driver of the EV tries to charge the EV by traveling to a charging facility before encountering lack of electricity, there may be a case that charging is disabled due to breakdown or the like of the charging facility, or a case that charging cannot be started immediately after arrival because the charging facility is crowded. In such a case, the driver may try to go to another charging facility. However, since the travelable distance is shortened, the EV may not reach the another charging facility. The techniques of Patent Literatures 1 and 2 fail to disclose encouraging a driver to charge by assuming that charging may be disabled at a charging facility where the EV arrived.

Also in a fuel cell vehicle (FCV) which travels by using hydrogen as fuel, in the present circumstances, the number of hydrogen supply facilities is small. When a hydrogen remaining amount within a hydrogen lank becomes zero, and the FCV is unable to travel, the FCV cannot easily return to a travelable state. Further, also in a conventional vehicle which travels by an engine, the number of supply facilities of fuel such as gasoline may be small, or a time zone during which fuel is suppliable is limited depending on a district. In such a district, recovery of the vehicle is not easy when the vehicle runs out of gas. In view of the above, providing a measure, taking into consideration a case that energy cannot be supplied at a supply facility where the vehicle arrived, is important, whatever the type of energy source of the vehicle is.

CITATION LIST

Patent Literature

Patent Literature 1: Japanese Unexamined Patent Application Publication No. 2015-69259

Patent Literature 1: Japanese Unexamined Patent Application Publication No. 2016-217769

SUMMARY OF INVENTION

An object of the present invention is to provide a vehicle display device that enables to reduce a risk that a vehicle may be unable to travel due to energy shortage.

As means for solving the above issue, a vehicle display device according to the present invention includes: a storage unit for storing position information on a plurality of supply facilities capable of supplying energy for driving a vehicle; a position information acquisition unit for acquiring position information of an own vehicle; a control unit for calculating a travel distance limit of the own vehicle, based on a remaining amount of energy accumulated in the own vehicle; and a display for displaying information calculated by the control unit. The control unit performs processing of extracting, based on position information of each of the supply facilities stored in the storage unit, the position information of the own vehicle acquired by the position information acquisition unit, and the travel distance limit calculated by the control unit, a farthest supply facility being a supply facility farthest from the own vehicle within the travel distance limit, and other supply facilities present within a predetermined distance from the farthest supply facility; processing of calculating, based on each piece of position information of the extracted farthest supply facility and the extracted other supply facilities, a degree of scattering being a numerical value indicating a degree of remoteness between the farthest supply facility and the other supply facilities; processing of calculating, based on the travel distance limit and the degree of scattering, a travelable distance being a distance by which the own vehicle is able to travel; and processing of causing the display to display the calculated travelable distance. In the processing of calculating the travelable distance, the travelable distance is decreased, as the degree of scattering increases.

DESCRIPTION OF EMBODIMENTS

Preferred embodiments according to the present invention are described with reference to the drawings.

First Embodiment

Figure 1:
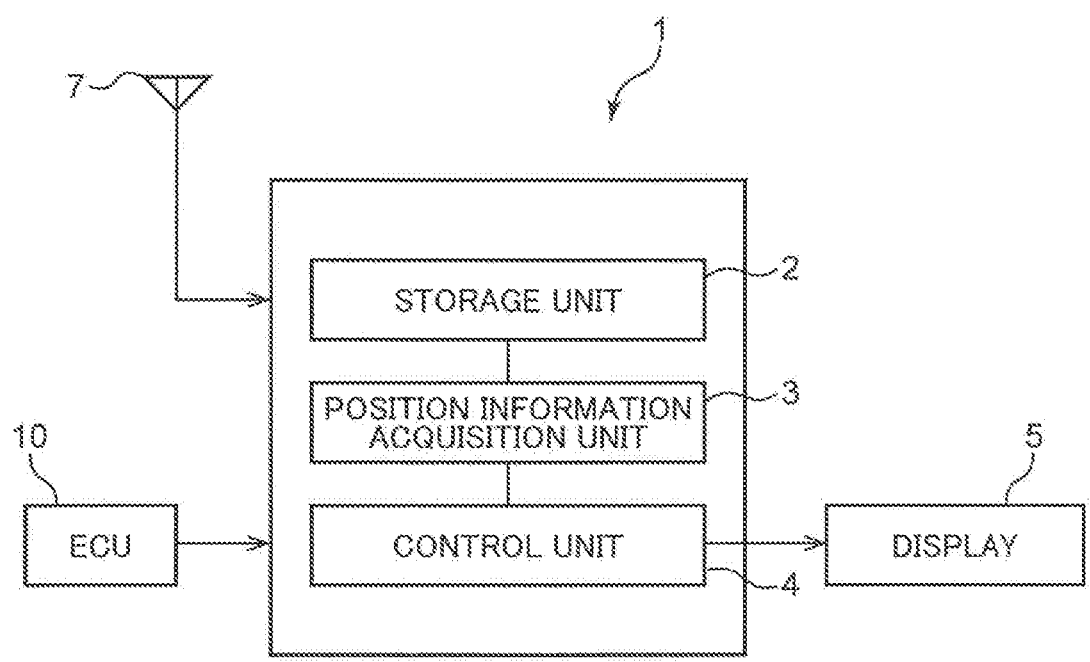
FIG. 1 is a block diagram illustrating a schematic configuration of a vehicle display device according to a first embodiment of the present invention.

FIG. 1 illustrates a schematic configuration of a vehicle display device 1 according to a first embodiment of the present invention. The vehicle display device 1 illustrated in FIG. 1 is mounted in a vehicle, and is communicably connected to an electronic control unit (hereinafter, referred to as an ECU) 10 for controlling the vehicle. The vehicle display device 1 includes a storage unit 2 for storing map information, and information on a traffic sign, a facility, and the like on a map; a position information acquisition unit 3 for acquiring position information of the vehicle, a control unit 4 for performing predetermined control, based on the information acquired from the storage unit 2 and the position information acquisition unit 3; and a display 5 capable of displaying the map information acquired from the storage unit 2, information calculated by the control unit 4, and the like. The control unit 4 is constituted of a central processing unit (CPU), a read-only memory (ROM), a random-access memory (RAM), and the like. Various programs and data for control are stored in the ROM. Data to be used when the CPU executes a series of processing are temporarily stored in the RAM. For example, an electric vehicle (EV) which travels by using, as a driving source, a motor which operates by electric power accumulated in a battery is appropriate as the vehicle in which the vehicle display device 1 is mounted. However, a fuel cell vehicle (FCV), and a vehicle (hereinafter, referred to as an automobile) which travels by using an engine as a driving source are also available.

The ECU 10 controls traveling of the vehicle, based on detection signals from various types of sensors provided in the vehicle. For example, the ECU 10 controls a rotational speed and the like of a driving source (a motor or an engine), based on a detection signal indicating an acceleration opening degree, and calculates vehicle information such as a vehicle speed and a travel distance, based on a detection signal from a wheel speed sensor and the like. The vehicle information to be calculated by the ECU 10 includes an energy remaining amount, an average energy consumption rate, and the like. The energy remaining amount is a batter) remaining amount in a case of an EV, and is a fuel remaining amount in a case of an FCV or an automobile. Further, the average energy consumption rate is an average electricity efficiency (a travel distance per unit power) in a case of an EV, and is an average fuel efficiency (a travel distance per fuel unit amount) in a case of an FCV or an automobile.

The position information acquisition unit 3 acquires position information such as a current location and a direction of a vehicle in which the vehicle display device 1 is mounted, in other words, an own vehicle, based on a Global Positioning System (GPS) signal input from a plurality of GPS satellites via a GPS antenna 7. The control unit 4 performs necessary information processing, based on the position information of the own vehicle, the information stored in the storage unit 2, and the vehicle information of the ECU 10 input to the vehicle display device 1, and causes the display 5 to display.

Further, the control unit 4 calculates a travel distance limit L, based on at least an energy remaining amount Wr included in the vehicle information to be output by the ECU 10, and causes the display 5 to display a travelable distance R1 (details will be described later), which is shorter than the calculated travel distance limit L, together with the energy remaining amount Wr. The energy remaining amount Wr is, in a case of an EV, a value, referred to as a state of charge (SOC) indicating a ratio of a current remaining amount of the battery with respect to a full capacity of the battery in terms of percentage; in a case of an FCV, a fuel remaining amount to be calculated based on an inner pressure and the like of a hydrogen tank; and in a case of an automobile, a fuel remaining amount to be calculated based on a fuel liquid surface position and the like within a fuel tank.

Next, the travel distance limit L is described.

The travel distance limit L is calculated by the control unit 4 according to the following equation (1), based on a vehicle travel distance DL, an energy consumption amount Wc (an electric power consumption amount or a fuel consumption amount) when the vehicle travels the distance DL, and the energy remaining amount Wr. The vehicle travel distance DL is calculated based on the position information of the own vehicle acquired by the position information acquisition unit 3. Further, the energy consumption amount Wc is calculated based on an energy remaining amount Wr' output by the ECU 10 when traveling has started, and the current energy remaining amount Wr.

$$L = Wr \times DL/Wc = Wr \times DL/(Wr' - Wr) \qquad (1)$$

It is also possible to calculate the travel distance limit L, based on the energy remaining amount Wr to be output by the ECU 10, and the average energy consumption rate. In this way, it is possible to calculate the travel distance limit L, based on a plurality of parameters including at least the energy remaining amount Wr.

The control unit 4 extracts supply facilities where the vehicle can reach, from among the plurality of energy supply facilities stored in the storage unit 2, and causes the display 5 to display them. The display control is described with reference to FIGS. 2 and 3.

The control unit 4 calculates, first in Step S1, the travel distance limit L according to the equation (1).

Subsequently, in Step S2, the control unit 4 calculates a distance from the current location to each of the supply facilities, based on the position information (the current location) of the own vehicle acquired by the position information acquisition unit 3, and position information of the plurality of supply facilities stored in the storage unit 2, within a range in which the distance from lire current location is smaller than the travel distance limit L. Calculation relating to a distance in each step after Step S2 is preferably performed on the basis of a travel distance on a road, in other words, a travel distance in a case that the vehicle travels from a start point to a destination along a road being a shortest route. However, in FIG. 3, for simplification, various distances to be calculated are indicated by direct distances. It is assumed that the following description is also made on the basis of FIG. 3, which is a simplified diagram.

Subsequently, in Step S3, the control unit 4 extracts a farthest supply facility being a supply facility farthest from the current location, based on the distance from the current location to each supply facility, which is calculated in Step S2; and calculates a distance D from the current location to the farthest supply facility. However, candidates for the farthest supply facility are limited to those around which another supply facility is present within a search distance, which is set for each supply facility. Specifically, the control unit 4 extracts, as a candidate facility, a supply facility around which another supply facility is present within the search distance, from among all supply facilities whose distances from the current location are smaller than the travel distance limit L; and specifies, as the farthest supply facility, a supply facility whose distance from the current location is longest among the candidate facilities. The search distance to be set for each supply facility is a value acquired by subtracting, from the travel distance limit L, a distance from the current location to each supply facility, and is a distance by which the vehicle is able to travel from a certain supply facility, when the vehicle arrives at the certain supply facility from the current location. In this way, in the present embodiment, a supply facility around which another supply facility does not present within a search distance, is excluded from candidates for the farthest supply facility. This is because evaluation relating to a degree of scattering to be described later cannot be performed with respect to such a supply facility.

Subsequently, in Step S4, the control unit 4 extracts, from the supply facilities whose distances from the current location are smaller than the travel distance limit L, supply facilities whose distances from the farthest supply facility extracted in Step S3 are smaller than a predetermined distance M; and calculates a distance from each of the extracted supply facilities to the farthest supply facility. The predetermined distance M is a value (M=L−D) acquired by subtracting, from the travel distance limit L, the distance D from the current location to the farthest supply facility; and is a distance by which the vehicle is able to travel from the farthest supply facility, when the vehicle arrives at the farthest supply facility from the current location.

Subsequently, in Step S5, the control unit 4 selects a supply facility whose distance calculated in Step S4 is shortest (nearest to the farthest supply facility), and calculates, as a remote distance α, a distance from the selected supply facility to the farthest supply facility. The remote distance α indicates that the larger the remote distance α is, the less supply facilities are present in the vicinity of the farthest supply facility. In other words, the remote distance a is a numerical value indicating a degree of remoteness (a degree of scattering) between the farthest supply facility and supply facilities in the vicinity of the farthest supply facility.

Subsequently, in Step S6, the control unit 4 calculates a travelable distance R1. Specifically, the control unit 4 acquires the travelable distance R1 (R1=L−α) by subtracting the remote distance a from the travel distance limit L. Therefore, when it is assumed that the travel distance limit L is constant, the travelable distance R1 decreases, as the remote distance α (a degree of scattering) increases.

Figure 3:
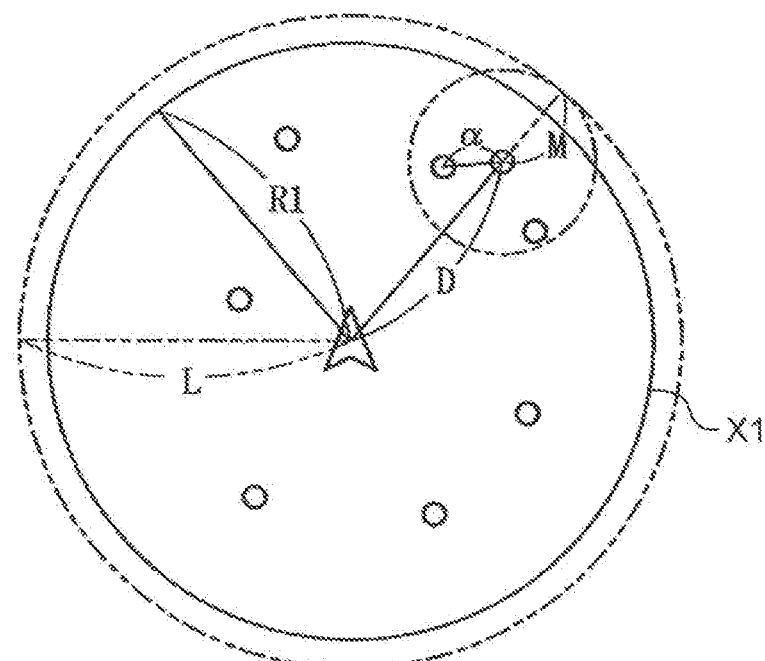
FIG. 3 is a diagram illustrating one example of display on a travelable distance according to the first embodiment.

Subsequently, in Step S7, live control unit 4 causes the display 5 to display the travelable distance R1 together with a supply facility. For example, as illustrated in FIG. 3, the control unit 4 causes the display 5 to display a circle X1 including the current location of the own vehicle indicated by the arrowhead-shaped portion as a center, and having a radius being equal to the travelable distance R1. Further, the control unit 4 causes the display 5 to display supply facilities (small hollow circles in FIG. 3) within the circle X1; and not to display a supply facility outside the circle X1 or to display a supply facility outside the circle X1 in a pattern (e.g. in a different color or size) different from the pattern of the supply facilities within the circle X1. It should be noted that only a part of the circle X1 may be displayed depending or a scale of indication or the like.

Next, operations and advantageous effects of the vehicle display device 1 according to the present embodiment are described.

The vehicle display device 1 encourages the driver to supply energy within the travelable distance R1 by displaying the travelable distance R1 shorter than the calculated travel distance limit L. Further, the vehicle display device 1 calculates, as a degree of scattering of supply facilities in the vicinity of the furthest supply facility, the remote distance a between the farthest supply facility and a supply facility nearest to the farthest supply facility, and encourages the driver to supply energy at a supply facility near the current location by decreasing the travelable distance R1, as the remote distance α increases, in other words, when not so many other supply facilities are present in the vicinity of the farthest supply facility.

In the above configuration, even when it becomes clear that energy supply is not available when the vehicle arrives at a supply facility within the travelable distance R1, the driver can drive the vehicle from the arrival place to another supply facility. In particular, even when it becomes clear that energy supply is not available when the vehicle arrives at the farthest supply facility farthest within the travelable distance R1, the driver can drive the vehicle at least to another supply facility nearest to the arrival place. Therefore, even when energy supply is not available at a supply facility where the vehicle arrived, the driver can secure a next supply opportunity. Thus, it is possible to advantageously reduce a risk that the vehicle may be disabled to travel due to energy shortage.

Second Embodiment

A second embodiment according to the present invention is described with reference to FIGS. 4 and 5. The second embodiment is configured by partially modifying display control according to the first embodiment. Since configurations of a vehicle and a vehicle display device 1 are similar to those in the first embodiment, description thereof is omitted.

Figure 2:
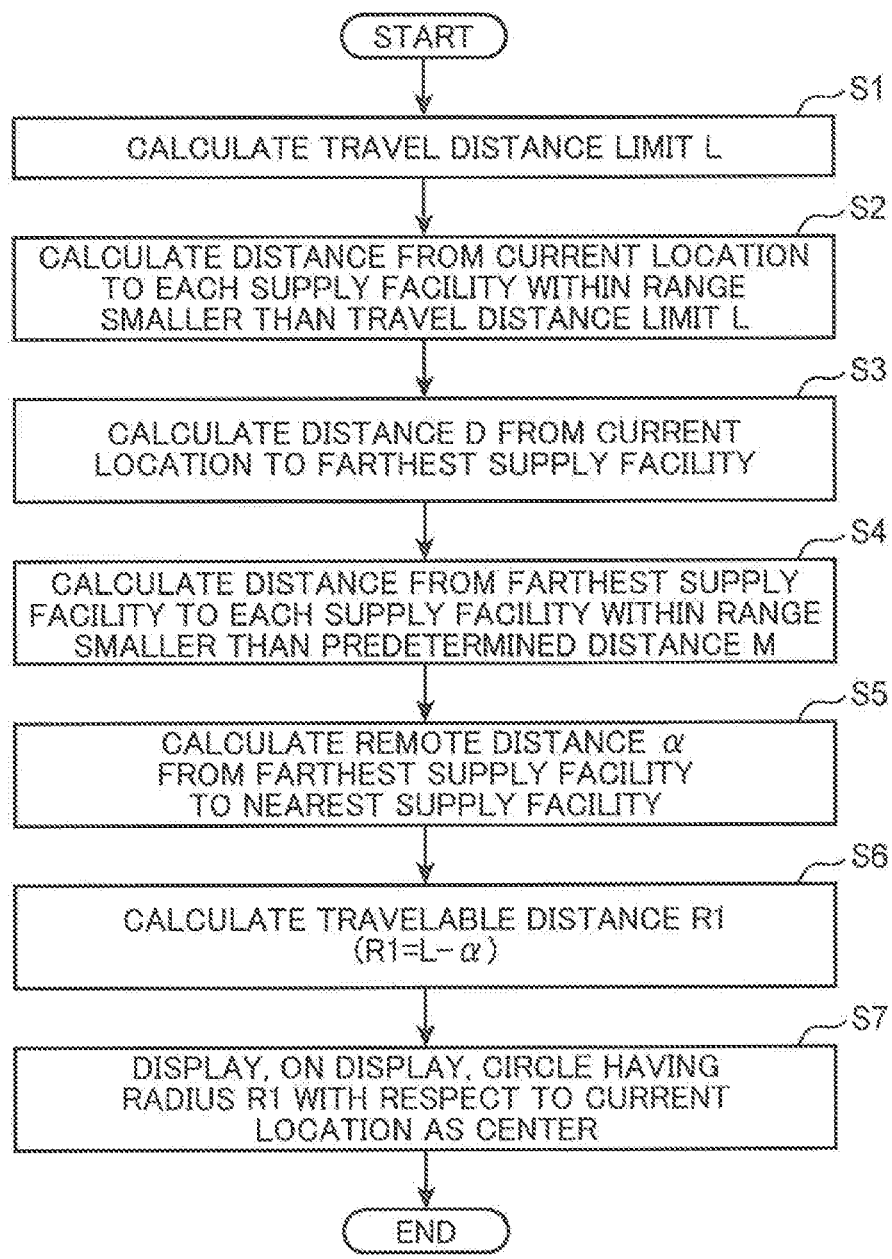
FIG. 2 is a flowchart illustrating a content of display control on a travelable distance according to the first embodiment.
Figure 4:
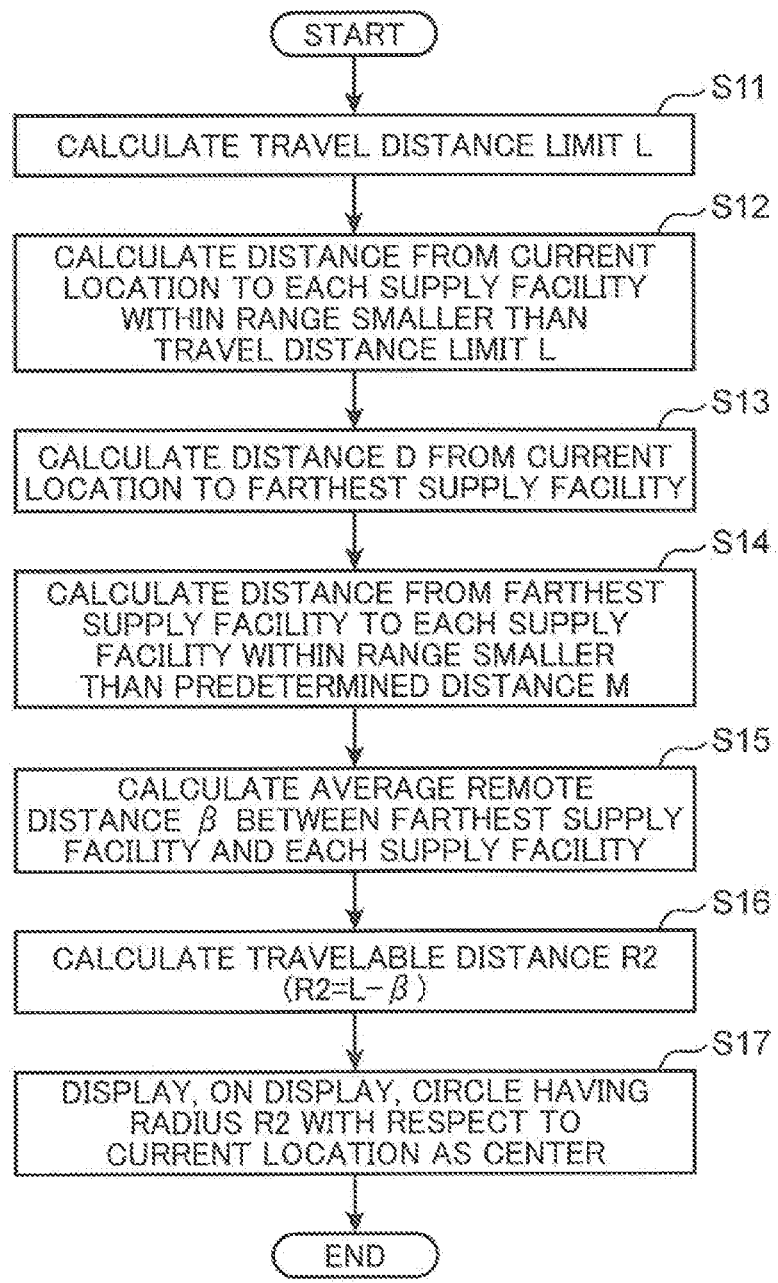
FIG. 4 is a flowchart illustrating a content of display control on a travelable distance according to a second embodiment of the present invention.
Figure 5:
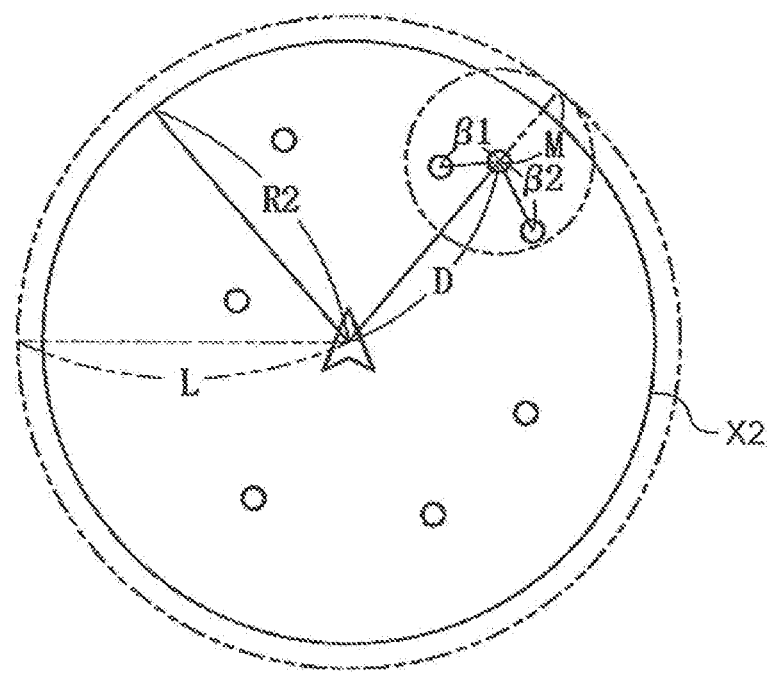
FIG. 5 is a diagram illustrating one example of display on a travelable distance according to the second embodiment.

Processing of Steps S11 to S14 in FIG. 4 are similar to Steps S1 to S4 according to the first embodiment (FIG. 2). Specifically, a control unit 4 calculates a travel distance limit L of an own vehicle (S11), calculates a distance to each of supply facilities, which satisfy that a distance from the current location is smaller than the travel distance limit L (S12), calculates a distance D to a farthest supply facility farthest within a range smaller than the travel distance limit L (S13), and calculates a distance from each of supply facilities, which satisfy that a distance from the farthest supply facility is smaller than a predetermined distance M, to the farthest supply facility (S14). The predetermined distance M is a distance by which the vehicle is able to travel from the farthest supply facility, when the vehicle arrives at the farthest supply facility from the current location.

Subsequently, in Step S15, the control unit 4 calculates, as an average remote distance β, an average value of the distances calculated in Step S14. For example, as illustrated in FIG. 5, it is assumed that there are two supply facilities, which satisfy that a distance from the current location is smaller than lire travel distance limit L, and a distance from the farthest supply facility (a supply facility whose distance from the current location is D) is smaller than the predetermined distance M; and distances (remote distances) from the farthest supply facility to the two supply facilities are respectively β1 and β2. In this case, the control unit 4 calculates an average value of the remote distances β1 and β2, and uses tire average value as the average remote distance β. The average remote distance β indicates that the larger the average remote distance β is, the less supply facilities arc present in the vicinity of the farthest supply facility. In other words, the average remote distance β is a numerical value indicating a degree of remoteness (a degree of scattering) between the farthest supply facility and supply facilities in the vicinity of the farthest supply facility.

Subsequently, in Step S16, the control unit 4 calculates a travelable distance R2. Specifically, the control unit 4 acquires the travelable distance R2 (R2=L−β) by subtracting the average remote distance β from the travel distance limit L. Therefore, when it is assumed that the travel distance limit L is constant, the travelable distance R2 decreases, as the average remote distance β (a degree of scattering) increases.

Subsequently, in Step S17, the control unit 4 causes the display 5 to display the travelable distance R2 together with a supply facility. For example, as illustrated in FIG. 5, the control unit 4 causes the display 5 to display a circle X2 including the current location of the own vehicle indicated by tire arrowhead-shaped portion as a center, and having a radius being equal to the travelable distance R2. Further, the control unit 4 causes the display 5 to display supply facilities (small hollow circles) in a similar manner as in the case of the first embodiment.

Next, operations and advantageous effects of the vehicle display device 1 according to the present embodiment are described.

The vehicle display device 1 encourages the driver to supply energy within the travelable distance R2 by displaying the travelable distance R2 shorter than the calculated travel distance limit L. Further, the vehicle display device 1 calculates, as a degree of scattering of supply facilities in the vicinity of the farthest supply facility, the average remote distance β between the farthest supply facility and supply facilities reachable from Che farthest supply facility; and encourages the driver to supply energy at a supply facility near the current location by decreasing the travelable distance R2, as the average remote distance β increases, in other words, when not so many other supply facilities arc present in the vicinity of the farthest supply facility.

In the above configuration, even when it becomes clear that energy supply is not available when the vehicle arrives at a supply facility within the travelable distance R2, the driver can drive the vehicle from the arrival place to another supply facility. In particular, even when it becomes clear that energy supply is not available when the vehicle arrives at the farthest supply facility farthest within the travelable distance R2, the driver can drive the vehicle at least to another supply facility nearest to the arrival place. Therefore, even when energy supply is not available at a supply facility where the vehicle arrived, the driver can secure a next supply opportunity. Thus, it is possible to advantageously reduce a risk that the vehicle may be disabled to travel due to energy shortage.

In each of the embodiments, the travelable distance R1 or R2 is acquired by subtracting the remote distance α or the average remote distance β from the travel distance limit L. It is also possible to acquire a travelable distance by adding, to the distance D from the current location to the farthest supply facility, the remote distance α or the average remote distance β.

Also, a person skilled in the art may carry out the present invention by adding various modifications to the embodiments, as far as the modifications do not depart from the gist of the present invention. The present invention includes such various modifications.

Overview of Embodiments

The following is an overview of the embodiments.

A vehicle display device according to the embodiment includes: a storage unit for storing position information on a plurality of supply facilities capable of supplying energy for driving a vehicle; a position information acquisition unit for acquiring position information of an own vehicle; a control unit for calculating a travel distance limit of the own vehicle, based on a remaining amount of energy accumulated in the own vehicle; and a display for displaying information calculated by the control unit. The control unit performs processing of extracting, based on position information of each of the supply facilities stored in the storage unit, the position information of the own vehicle acquired by the position information acquisition unit, and the travel distance limit calculated by the control unit, a farthest supply facility being a supply facility farthest from the own vehicle within the travel distance limit, and the other supply facilities present within a predetermined distance from the farthest supply facility; processing of calculating, based on each piece of position information of the extracted farthest supply facility and the extracted other supply facilities, a degree of scattering being a numerical value indicating a degree of remoteness between the farthest supply facility and the other supply facilities; processing of calculating, based on the travel distance limit and the degree of scattering, a travelable distance being a distance by which the own vehicle is able to travel; and processing of causing the display to display the calculated travelable distance. In the processing of calculating the travel able distance, the travelable distance is decreased, as tire degree of scattering increases.

In the above configuration, it is possible to encourage the driver to supply energy within the travelable distance by displaying the travelable distance shorter than the travel distance limit; and encourage the driver to supply energy at a supply facility near the current location by decreasing the travelable distance, as the degree of scattering of supply facilities present in the vicinity of the farthest supply facility increases. Therefore, even when it becomes clear that energy supply is not available when the vehicle arrives at a supply facility within the travelable distance, the driver can drive the vehicle from the arrival place to another supply facility. In particular, even when it becomes clear that energy supply is not available when the vehicle arrives at the farthest supply facility farthest within the travelable distance, the driver can drive the vehicle at least to another supply facility nearest to the arrival place. Therefore, even when energy supply is not available at a supply facility where the vehicle arrived, the driver can secure a next supply opportunity. Thus, it is possible to advantageously reduce a risk that the vehicle may be disabled to travel due to energy shortage.

The degree of scattering may be a remote distance between a supply facility nearest to the farthest supply facility among the other supply facilities, and the farthest supply facility.

The remote distance calculated as described above indicates that the larger the remote distance is, the less supply facilities are present in the vicinity of the farthest supply facility. Therefore, it is possible to more advantageously reduce a risk that the vehicle may be disabled to travel due to energy shortage by encouraging the driver to supply energy at a supply facility near the current location by decreasing the travelable distance, as the remote distance increases.

The degree of scattering may be an average value of remote distances between the other supply facilities and the farthest supply facility.

The average value (the average remote distance) of the remote distances calculated as described above indicates that the larger the average remote distance is, the less supply facilities are present in the vicinity of the farthest supply facility. Therefore, it is possible to more advantageously reduce a risk that the vehicle may be disabled to travel due to energy shortage by encouraging the driver to supply energy at a supply facility near the current location by decreasing the travelable distance, as the average remote distance increases.

The invention claimed is:

1. A vehicle display device comprising:
a memory configured to store position information on a plurality of supply facilities capable of supplying energy for driving a vehicle;
a processor configured to acquire position information of an own vehicle;
a controller configured to calculate a travel distance limit of the own vehicle, based on a remaining amount of energy accumulated in the own vehicle; and
a display for displaying information calculated by the controller, wherein
the controller is configured to perform
a process for extracting, based on position information of each of the supply facilities stored in the memory, the position information of the own vehicle, and the travel distance limit calculated by the controller, a farthest supply facility being a supply facility farthest from the own vehicle within the travel distance limit, and other supply facilities present within a predetermined distance from the farthest supply facility;
a process for calculating, based on each piece of position information of the extracted farthest supply facility and the extracted other supply facilities, a degree of scattering being a numerical value indicating a degree of remoteness between the farthest supply facility and the other supply facilities;
a process for calculating, by subtracting the degree of scattering from the travel distance limit, a travelable distance being a distance by which the own vehicle is able to travel; and
a process for causing the display to display the calculated travelable distance, and
in the process for calculating the travelable distance, the travelable distance is decreased, as the degree of scattering increases.

2. The vehicle display device according to claim 1, wherein
the degree of scattering is a remote distance between a supply facility nearest to the farthest supply facility among the other supply facilities, and the farthest supply facility.

3. The vehicle display device according to claim 2, wherein in the process of causing the display to display the calculated travelable distance,
the controller causes the display to display a circle including the current location of the own vehicle as a center and having a radius equal to the travelable distance, and supply facilities within the circle, and
the controller causes the display to refrain from displaying a supply facility outside the circle or a supply facility outside the circle in a pattern different from the pattern of the supply facilities within the circle.

4. The vehicle display device according to claim 1, wherein
the degree of scattering is an average value of remote distances between the other supply facilities and the farthest supply facility.

5. The vehicle display device according to claim 4, wherein in the process of causing the display to display the calculated travelable distance,
the controller causes the display to display a circle including the current location of the own vehicle as a center and having a radius equal to the travelable distance, and supply facilities within the circle, and
the controller causes the display to refrain from displaying a supply facility outside the circle or a supply facility outside the circle in a pattern different from the pattern of the supply facilities within the circle.

6. The vehicle display device according to claim 1, wherein in the process of causing the display to display the calculated travelable distance,
the controller causes the display to display a circle including the current location of the own vehicle as a center and having a radius equal to the travelable distance, and supply facilities within the circle, and
the controller causes the display to refrain from displaying a supply facility outside the circle or a supply facility outside the circle in a pattern different from the pattern of the supply facilities within the circle.

7. A method for controlling a vehicle display device provided with a memory configured to store position information on a plurality of supply facilities capable of supplying energy for driving a vehicle, a processor configured to acquire position information of an own vehicle, and a display configured to displaying various information, the method comprising:
calculating a travel distance limit of the own vehicle, based on a remaining amount of energy accumulated in the own vehicle;
calculating a calculated distance from the own vehicle to each of the supply facilities, based on the position information of the own vehicle acquired by the processor, and the position information of the plurality of supply facilities stored in the memory, within a range in which the calculated distance from the own vehicle is smaller than the travel distance limit;
extracting, as a farthest supply facility, a supply facility farthest from the own vehicle among candidate facilities around which another supply facility presents within a predetermined search distance, based on the calculated distance from the own vehicle to each supply facility, and calculating a distance from the own vehicle to the farthest supply facility;

extracting, from the supply facilities whose distances from the own vehicle are smaller than the travel distance limit, supply facilities whose distances from the farthest supply facility are smaller than a predetermined distance, and calculating a respective distance from each of the extracted supply facilities to the farthest supply facility;

selecting a supply facility whose respective distance is shortest, and calculating, as a degree of scattering, a distance from the selected supply facility to the farthest supply facility;

calculating a travelable distance by subtracting the degree of scattering from the travel distance limit; and causing the display to display the travelable distance.

* * * * *